Oct. 1, 1940.  J. LEDWINKA  2,216,120
COMBINED BODY AND CHASSIS STRUCTURE
Filed Nov. 30, 1937   3 Sheets-Sheet 1
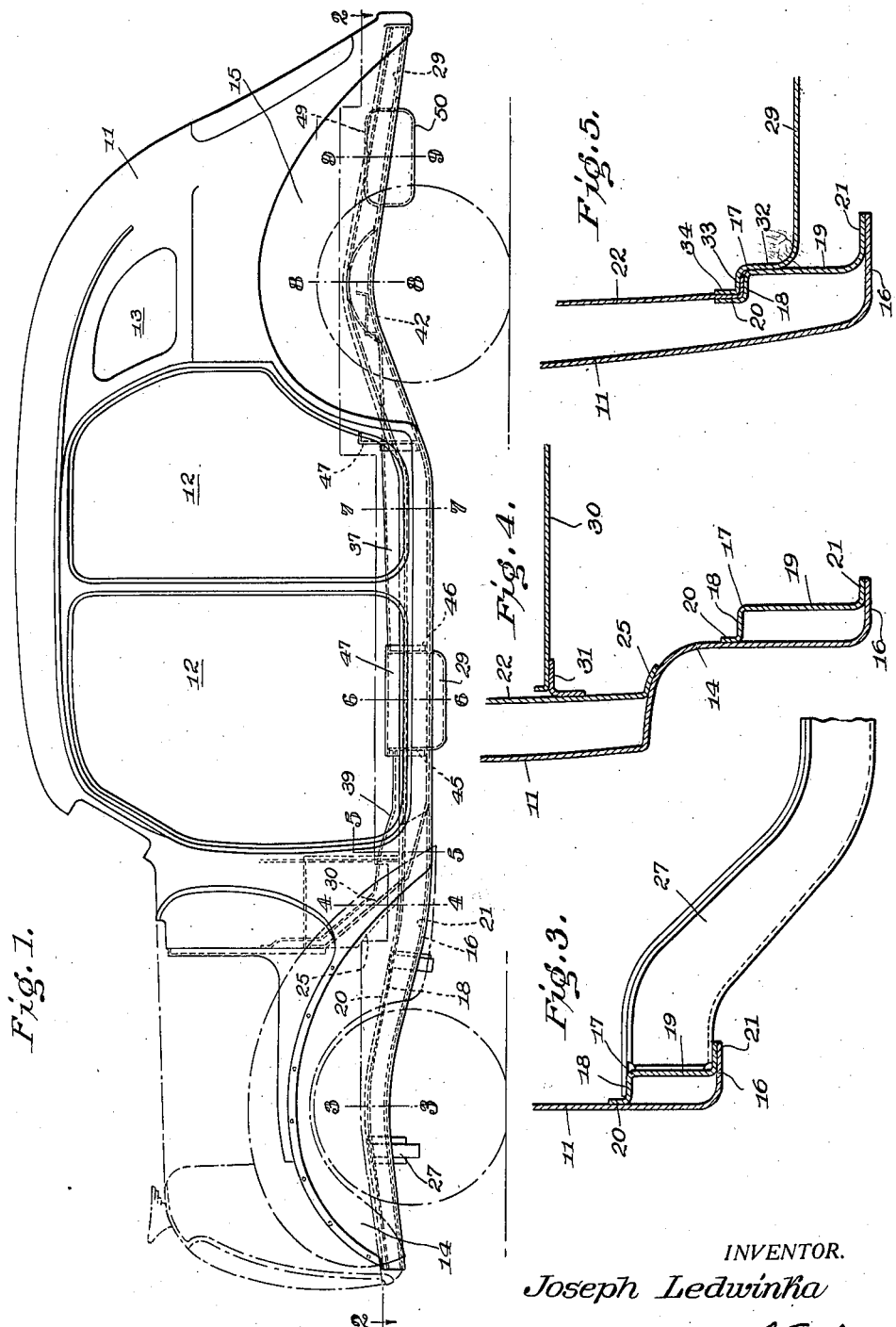
INVENTOR.
Joseph Ledwinka
BY John P. Tasbox
ATTORNEY.

Oct. 1, 1940.  J. LEDWINKA  2,216,120
COMBINED BODY AND CHASSIS STRUCTURE
Filed Nov. 30, 1937  3 Sheets-Sheet 2
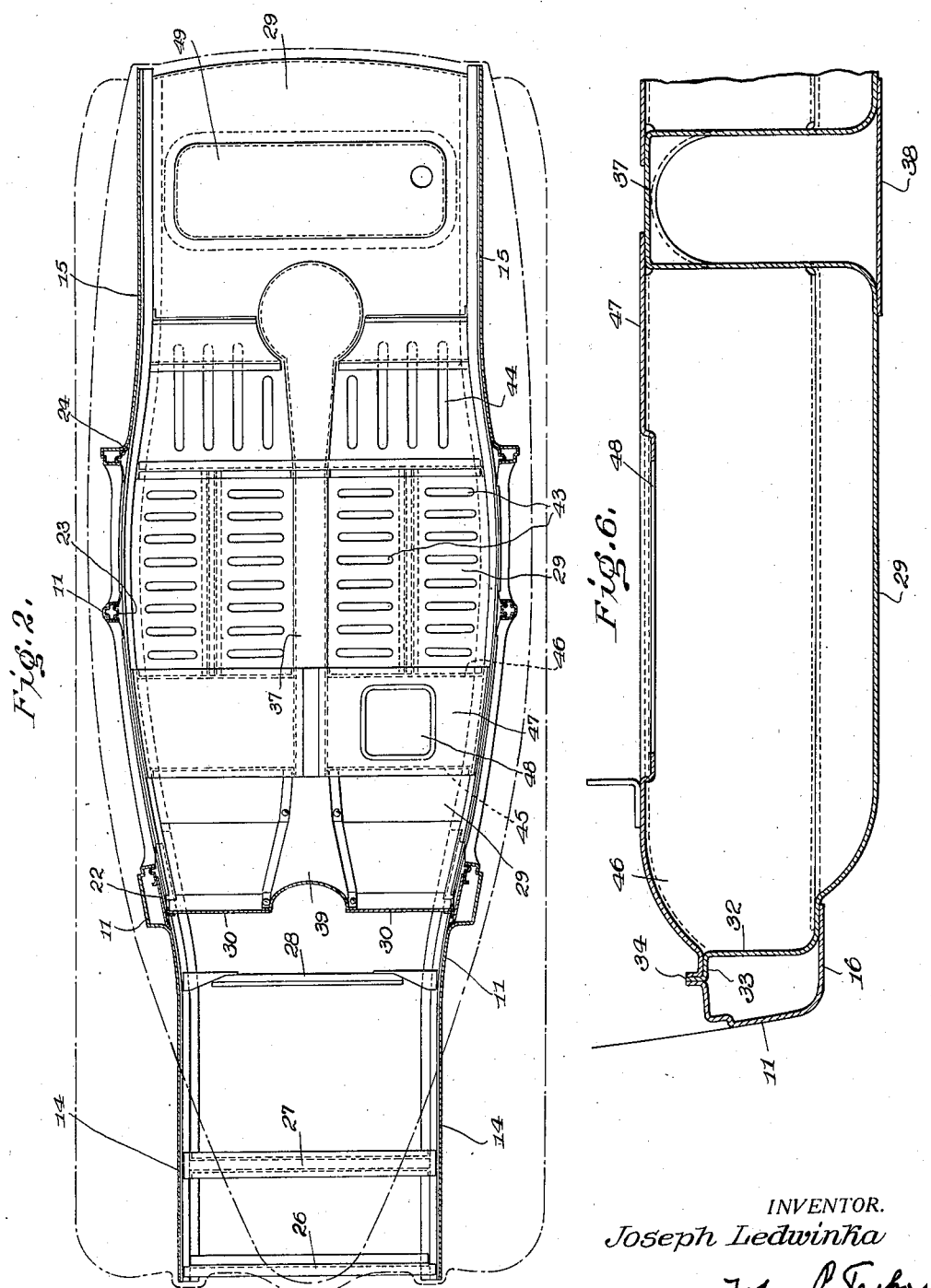
INVENTOR.
Joseph Ledwinka
BY John P. Tarbox
ATTORNEY.

Oct. 1, 1940.  J. LEDWINKA  2,216,120
COMBINED BODY AND CHASSIS STRUCTURE
Filed Nov. 30, 1937  3 Sheets-Sheet 3
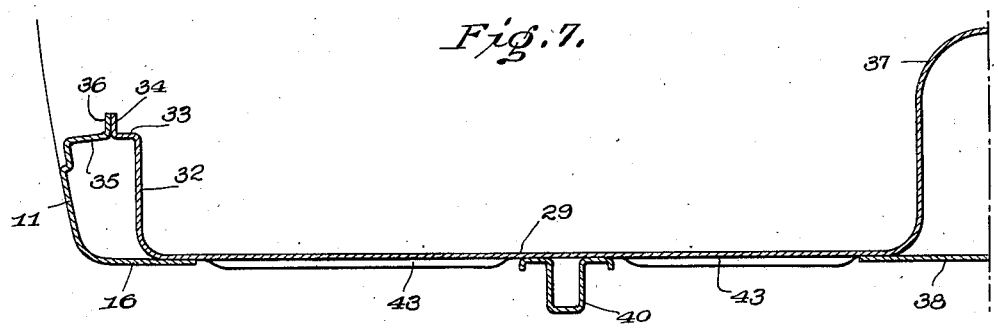
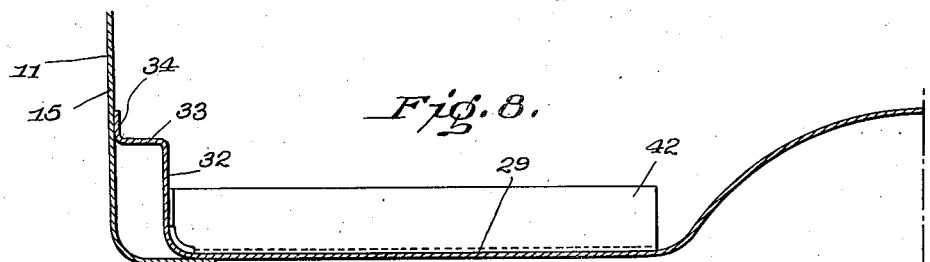
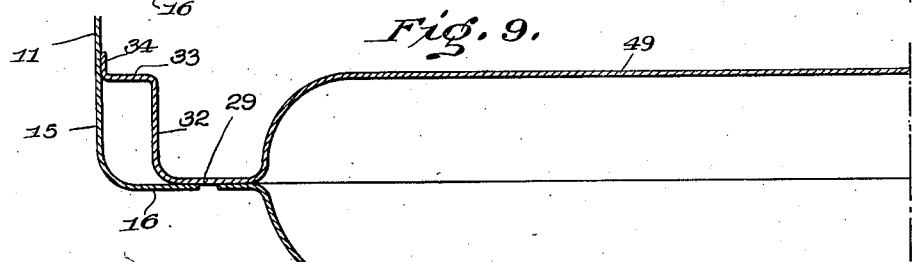
INVENTOR.
Joseph Ledwinka
BY John P. Fairbox
ATTORNEY.

Patented Oct. 1, 1940

2,216,120

UNITED STATES PATENT OFFICE 2,216,120

COMBINED BODY AND CHASSIS STRUCTURE

Joseph Ledwinka, Philadelphia, Pa., assignor to Edward G. Budd Manufacturing Company, Philadelphia, Pa., a corporation of Pennsylvania Application November 30, 1937, Serial No. 177,221

6 Claims. (Cl. 296—28)

The invention relates to the construction of vehicle bodies especially of motor car bodies. The invention relates more particularly to that kind of body forming simultaneously the chassis structure.

It is an object of the invention to simplify the construction and the manufacture of such combined body and chassis structures, to give to the structure the necessary strength and to reduce the cost.

This object is mainly obtained by the invention by forming box section side sills partly from the body side wall and the body flooring, and, partly from the side wall and separate reinforcing members.

A further object of the invention consists in the provision of very effective cross bracing. This object is obtained by forming a box section cross brace of great cross sectional area from the sheet metal flooring and a seat support.

Still a further object of the invention is to provide a container especially a fuel tank, the walls of which are partly formed by the sheet metal flooring.

Other and further objects and advantages of the invention and the manner in which they are attained will become apparent from the following detailed description in connection with the drawings forming a part thereof.

In the drawings:

Fig. 1 represents in side elevation a sedan type of combined body and chassis structure in accordance with the invention.

Fig. 2 is a plan view of the combined chassis and body underframe structure and a section through the vertical body walls taken substantially along the line 2—2 of Fig. 1.

Figs. 3 to 9 inclusive are detailed sectional views through the longitudinal side sill members and the adjacent parts taken substantially along the correspondingly numbered lines of Fig. 1.

Fig. 10 is an enlarged detailed inside view of the one side sill structure and adjacent parts in the A-posts and toe-board region.

The body shown in the drawings comprises side wall members designated generally by the numeral 11; each of these side wall members extending from the extreme rear to the extreme front of the combined structure may be formed from one unitary stamping. These side members 11 surround the door and window openings 12, 13, and comprise the wheel housings 14 and 15. An inwardly directed flange 16 is bent off from the lower margin of the side wall members 11. A separate reinforcing member 17 forming in cross section an outwardly and downwardly opening angle is shaped to conform with the lower margin of the forward end of each side wall member.

The members 17 extend from the forward end of the combined body and chassis structure rearwardly to the A-post region. The arms 18 and 19 of the member 17 are provided with laterally bent off flanges 20 and 21 respectively and are fastened preferably by spot welding these flanges to the vertical wall 14 of the front wheel housing and the lower marginal flange 16 of the side wall member respectively. In the region between the front wheel housing 14 and the A-post, the arm 18 of the member 17 and its flange 20 are spaced inwardly from the main body of the side wall member 11, as shown in Fig. 5.

The side wall members 11 are additionally reinforced in the cowl region and in the region of the door posts by inner stampings 22, 23 and 24. The stamping 22 is fastened through a lateral flange 25 to the crown of the one wheel housing 14 and to the arm 18 and the flange 20 of the member 17, see Figs. 2, 4, 5 and 10.

The forward ends of the two side wall members 11 and their reinforcing member 17 are connected with each other by cross braces 26, 27 and 28. These cross members may be box shaped in cross section and may serve as supports for the power plant.

The sheet metal flooring designated generally by the numeral 29 extends from the cowl region to the rear of the combined structure. The entire flooring may be stamped from one unitary sheet metal plate. The front end of the flooring 29 is bent upwardly so as to form the toe-board 30, the lateral margins of the toe-board 30 are connected by means of intermediate strips 31 to the inner side wall members 22 and form thereby an additional cross bracing in the cowl region.

Along the lateral margins of the flooring 29, flanges 32 and 33 are bent off which form together an outwardly and downwardly opening angle section sill. The main body of the flooring 29 is fastened as by spot welding to the inwardly directed flange 16 of the side wall stamping 11 whereas the outwardly directed arm 33 of the flooring is fastened to a vertical part of the side wall member 11, by means of an upwardly bent off marginal flange 34 of said arm 33. In the region of the rear wheel housing the flange 34 rests against and is fastened to a vertical part of the wheel housing. In the region of the door openings, the outer side wall member 11 is provided with an inwardly directed flange 35 which rests by a narrow marginal upwardly directed flange 36 against flange 34 and is connected with the same as by spot welding. In the region of the A-posts, the arms 32 and 33 of the floor stamping 29 overlap the walls 18, 19 and 20 of the reinforcing member 17 and the lower margin of the inner side wall member 22.

The lower margins of the side wall members 11 and their bottom flanges 16 form together with the reinforcing members 17 and the lateral flanges 32, 33, of the flooring 29, substantially box section side sills extending from end to end of the combined body and chassis structure.

Adjacent the longitudinal central plane the sheet metal flooring 29 is provided with an upwardly offset member 37 forming a downwardly opening channel and housing the driving shaft (not shown). This channel 37 is closed by a plate 38 throughout a part of its length. The channel 37 is continued in the toe-board region by a separate member 39 connected along its margins to the inner longitudinal margins of the two parts of the toe-board 30.

The flooring 29 is reinforced in longitudinal and transverse direction by members 40, 41 and 42 and by ribs 43 and 44. The cross braces 41 and 42 form the support for the rear seat cushion.

An especially strong and effective cross bracing is provided by the front seat support. This front seat support comprises forward and rearward vertical walls 45 and 46 and a horizontal upper wall 47. These walls are connected with the flanges 32, 33 and 34 of the side sill members and with the channel shape member 37. The vertical walls 45 and 46 are connected with the top wall 47 and with the flooring 29. Hereby a box section cross brace is created which has a very great cross sectional area and a correspondingly great stiffness. The interior of this cross brace may be accessible to openings 48 so that the interior may serve for housing the storage battery or other articles as tools. So as to enlarge the interior of this hollow cross member, the flooring 29 is downwardly offset in the region between the two vertical transverse walls 45 and 46 as clearly to be seen from Figs. 1 and 6.

Behind the rear seat support 42, the region of the flooring 29 is upwardly offset at 49. Along the margins of this offset region 49, a lower stamping 50 is fastened as by welding. The stamping 50 forms an upwardly opening basin. The members 49 and 50 together form a closed container which may serve as a fuel tank.

Many modifications of the invention may be possible, such modifications shall, however, be protected by the appended claims.

What I claim is:

1. In a combined body underframe and chassis structure for a vehicle, a body side wall member extending from the lower margin of the body upwardly beyond the threshold, a floor stamping extending over a part of the length of the vehicle only, a hollow underframe side sill structure, at least one wall of said sill structure being formed by the lower marginal part of said side wall member, at least one other wall of said sill structure being formed in the region of said floor stamping by an integral marginal part thereof whereas in a region of said sill structure which extends in the longitudinal direction of the vehicle beyond said floor stamping, said other wall of said sill structure is formed by a member made separately from said floor stamping.

2. In a combined body underframe and chassis structure for a vehicle, a body side wall member extending from the lower margin of the body upwardly beyond the threshold, a floor stamping extending over a part of the length of the vehicle only, a hollow underframe side sill structure, at least one wall of said sill structure being formed by the lower marginal part of said side wall member, at least one other wall of said sill structure being formed in the region of said floor stamping by an integral marginal part thereof whereas in a region of said sill structure which extends in the longitudinal direction of the vehicle beyond said floor stamping, said other wall of said sill structure is formed by a member made separately from said floor stamping, and being generally angle shaped in cross section.

3. In a combined body underframe and chassis structure for a vehicle, a body side wall member extending from the lower margin of the body upwardly beyond the threshold, a floor stamping extending over a part of the length of the vehicle only, a hollow underframe side sill structure, at least one wall of said sill structure being formed by the lower marginal part of said side wall member, at least one other wall of said sill structure being formed in the region of said floor stamping by an integral marginal part thereof whereas in a region of said sill structure which extends in the longitudinal direction of the vehicle beyond said floor stamping, said other wall of said sill structure is formed by a member made separately from said floor stamping, said sill wall integral with said floor stamping and said other sill wall formed by said separately made member overlapping each other a short distance of the length of either of them.

4. In a combined body underframe and chassis structure for an automobile, a body side wall member extending from the lower margin of the body upwardly beyond the threshold, a floor stamping extending from about the cowl region rearwardly through the threshold region, a hollow underframe side sill structure, at least one wall of said sill structure being formed by the lower marginal part of said side wall member, at least one other wall of said sill structure being formed in the region of said floor stamping by an integral marginal part thereof whereas in the region of the vehicle extending from about the cowl region forwardly said other wall of said sill structure is formed by a member made separately from said floor stamping.

5. In a combined body underframe and chassis structure for an automobile, a body side wall member extending from the lower margin of the body upwardly beyond the threshold, a floor stamping extending from about the cowl region through the threshold region and the rear wheel housing region to substantially the rear end of the car, a hollow underframe side sill structure, at least one wall of said sill structure being formed by the lower marginal part of said side wall member, at least one other wall of said sill structure being formed in said threshold and rear wheel housing region by an integral marginal part thereof whereas in the region of the vehicle extending from about the cowl region forwardly said other wall of said sill structure is formed by a member made separately from said floor stamping.

6. In a combined body and chassis structure, side sill structures along the lower longitudinal margins of the body structure, a sheet metal flooring in the passengers' space, a downwardly opening box structure extending across the body, the lower transversely extending margins of which are fastened to the flooring and the lateral longitudinally extending margins to the side sill structure, said flooring being downwardly offset in the region of said box structure thereby providing a box sectional bracing of great cross sectional area and of corresponding strength and a storage chamber of great capacity.

JOSEPH LEDWINKA.